US007363633B1

(12) United States Patent
Goldick et al.

(10) Patent No.: US 7,363,633 B1
(45) Date of Patent: Apr. 22, 2008

(54) REGISTERING AND STORING DEPENDENCIES AMONG APPLICATIONS AND OBJECTS IN A COMPUTER SYSTEM AND COMMUNICATING THE DEPENDENCIES TO A RECOVERY OR BACKUP SERVICE

(75) Inventors: Jonathan S. Goldick, Seattle, WA (US); Luis Felipe Cabrera, Bellevue, WA (US); Paul Oltean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,250

(22) Filed: Apr. 24, 2000

(51) Int. Cl.
*G06F 3/00* (2006.01)
*G06F 12/00* (2006.01)
*G06F 9/44* (2006.01)
*G06F 15/16* (2006.01)

(52) U.S. Cl. .................... 719/328; 707/202; 709/202

(58) Field of Classification Search ............ 709/328, 709/200–203; 707/202, 1, 200; 711/162, 711/38, 161, 133, 135, 138; 719/328, 310–313; 395/676, 683
See application file for complete search history.

(56) References Cited

U.S. PATENT DOCUMENTS

| | | | | |
|---|---|---|---|---|
| 5,530,800 A | * | 6/1996 | Larsson et al. ............ 714/2 |
| 5,590,277 A | * | 12/1996 | Fuchs et al. ............ 714/38 |
| 5,832,283 A | * | 11/1998 | Chou et al. ............ 713/300 |
| 5,867,650 A | * | 2/1999 | Osterman ............ 709/203 |
| 5,870,763 A | * | 2/1999 | Lomet ............ 707/202 |
| 5,872,979 A | | 2/1999 | Edel et al. ............ 395/712 |
| 5,920,873 A | * | 7/1999 | Van Huben et al. ....... 707/202 |
| 5,938,775 A | * | 8/1999 | Damani et al. ............ 714/15 |
| 5,946,698 A | * | 8/1999 | Lomet ............ 707/202 |
| 5,995,958 A | * | 11/1999 | Xu ............ 707/3 |
| 6,029,160 A | * | 2/2000 | Cabrera et al. ............ 707/1 |
| 6,031,987 A | * | 2/2000 | Damani et al. ............ 703/17 |
| 6,067,550 A | * | 5/2000 | Lomet ............ 707/202 |
| 6,119,129 A | * | 9/2000 | Traversat et al. ......... 707/202 |

(Continued)

FOREIGN PATENT DOCUMENTS

WO     WO 99/45465     9/1999

OTHER PUBLICATIONS

IBM® Technical Disclosure Bulletin, "Safe Mechanism for Installing Operating System Updates with Applications," 1998, 41(01), 557-559.

*Primary Examiner*—Haresh Patel
(74) *Attorney, Agent, or Firm*—Woodcock Washburn LLP

(57) ABSTRACT

An application programming interface protocol is provided for making requests to registered applications regarding applications' dependency information so that a table of dependency information relating to a target object can be recursively generated. When all of the applications' dependencies are captured at the same time for given volume(s) or object(s), the entire volume's or object's program and data dependency information may be maintained for the given time. With this dependency information, the computer system advantageously knows not only which files and in which order to freeze or flush files in connection with a backup, such as a snapshot, or restore of given volume(s) or object (s), but also knows which volume(s) or object(s) can be excluded from the freezing process. After a request by a service for application dependency information, the computer system can translate or process dependency information, thereby ordering recovery events over a given set of volumes or objects.

24 Claims, 7 Drawing Sheets

U.S. PATENT DOCUMENTS

| | | | |
|---|---|---|---|
| 6,151,607 A * | 11/2000 | Lomet .................. | 707/202 |
| 6,209,000 B1 * | 3/2001 | Klein et al. ............ | 707/203 |
| 6,237,020 B1 * | 5/2001 | Leymann et al. ....... | 709/201 |
| 6,247,121 B1 * | 6/2001 | Akkary et al. .......... | 712/239 |
| 6,269,431 B1 * | 7/2001 | Dunham ................ | 711/162 |
| 6,313,019 B1 * | 11/2001 | Subramanian et al. ... | 438/585 |
| 6,353,878 B1 * | 3/2002 | Dunham ................ | 711/162 |
| 6,397,308 B1 * | 5/2002 | Ofek et al. ............ | 711/162 |
| 6,481,699 B1 * | 11/2002 | Aihara et al. .......... | 261/34.2 |
| 6,513,019 B2 * | 1/2003 | Lewis .................. | 705/35 |
| 6,633,978 B1 * | 10/2003 | Angelo et al. ......... | 713/100 |
| 6,789,216 B2 * | 9/2004 | Zagorski et al. ....... | 714/38 |
| 6,820,118 B1 * | 11/2004 | Leymann et al. ....... | 709/223 |
| 6,839,843 B1 * | 1/2005 | Bacha et al. .......... | 713/176 |

* cited by examiner

REGISTERING AND STORING DEPENDENCIES AMONG APPLICATIONS AND OBJECTS IN A COMPUTER SYSTEM AND COMMUNICATING THE DEPENDENCIES TO A RECOVERY OR BACKUP SERVICE

BACKGROUND OF THE INVENTION

1. Field of the Invention

The present invention relates to the backup or restoration of aspects of a computer system. More particularly, the present invention relates to a method and system for storing information about application dependencies, so that a computer system may efficiently return to a pre-crash state in connection with the dependency information. The present invention is also directed to any restore operation for a point-in-time for which backup information is available. Furthermore, the present invention is directed to circumstances wherein a rollback to a known or desired prior system configuration may be desirable.

2. Brief Description of Prior Developments

When a computer system crashes or the system freezes, many consequences ranging from the trivial to the irreparable may result. For standalone computers or client computers, a local system crash can result in the loss of work product. For example, anything that has not been saved properly may be lost from further access or use. Furthermore, a user may be inconvenienced by having to reboot the computer system, thereby expending additional time. In the case of network servers and other computer systems, a system crash can be even more sweeping, affecting multiple users, clients, and/or customers. As computer systems grow ever more complex, it seems that programmers, collectively speaking, have not been able to entirely eliminate system states in which a computer or application "freezes" or "crashes."

In the "restore to prior state" scenario what one desires is to restore a system to a desirable prior state. This has value when, for example, one has installed new software and the new system did not operate as expected.

Accepting it to be true that the probability of a system crash or freeze is not zero, a field of study, known as recovery, has arisen which relates to improving the process whereby a computer system recovers from a crashed state to a stable state. Recovery from system instability has been the subject of much research and development.

In general, the goal of reboot or redo recovery is, after a crash, to return the computer system to a previous and presumed correct state in which the computer system was operating immediately prior to the crash or at a point in time for which a consistent set of backup information is known. Because point in time information representative of a consistent state for all of an application's dependencies can not be ensured, some restore or backup services may incorrectly reset an application's state to an incorrect state, or alternatively, an extremely resource intensive brute force freeze or flush of every process of the computer system may be required in order to recover to a stable state for the application, volume or other object being backed up or restored.

For example, database system designers have attempted to design database recovery techniques which minimize the amount of data lost, the amount of work needed to recover to the pre-crash operating state, and the performance impact of recovery on the database system during normal operation. However, any time a file save operation, registry write operation, database storage operation, active directory write operation, or other like dependencies exist prior to a restore or backup service, it is desirable to recover to a pre-crash state representative of an atomic point in time.

A type of efficient backup technique that has been developed utilizes a snapshot provider for providing a snapshot of volume(s). Instead of implementing a brute force file by file recovery of a volume any time the system crashes, a snapshot enables the state of a computer system to be 'frozen' at an arbitrary point in time, thereby enabling a much faster and less resource intensive backup process. In general, a request is made for a snapshot to be created at a time $t_0$ and the creation of that snapshot is reflective of the volume data at time $t_0$. After $t_0$, the content of the snapshot itself can be backed-up, and a full backup is thus avoided through the use of differential data or files, which enables the system to efficiently act upon only the data that has changed since a previous time.

"Support for Multiple Temporal Snapshots of Same Volume", U.S. patent application Ser. No. 09/505,447, now U.S. Pat. No. 6,651,075, filed Feb. 16, 2000, to Cabrera et al., "Kernel-Based Crash-Consistency Coordinator" U.S. patent application Ser. No. 09/505,344, now U.S. Pat. No. 6,647,473, filed Feb. 16, 2000, to Golds et al and "System and Method for Growing Differential File on a Base Volume of a Snapshot", U.S. patent application Ser. No. 09/505,450, now U.S. Pat. No. 6,473,775, filed Feb. 16, 2000, to Kusters et al. relate to backup processes generally and are directed to different aspects of snapshot systems. These applications are hereby incorporated by reference, as background information relating to the provision of snapshot services.

However, one difficulty that is often encountered when trying to perform a backup or restore service for volume(s), application(s) or other object(s) is that, for a given object to be backed up or restored, the state of the object must be known for an atomic point in time. The most recent point in time for which the state of the object is known for a 'snapshot' in time is thus the most recent point in time to which the object can be restored.

Similarly, if a backup or snapshot service is being provided, the dependency information of the object to be backed up must be frozen in time and in a proper order for the snapshot to consistently reflect information about an atomic point in time.

If the state of applications, tasks or other objects upon which the given object to be backed up depends can not be extracted for such a single point in time, the back up process may be ruined since data in those applications, tasks or other objects may be corrupted by an arbitrary amount of time needed to finish backing up one task versus another. First, different tasks generally take a different amount of time to complete i.e., a read operation will generally take a different amount of time to complete than a write operation. Even the same task, such as a write operation in connection with a file system, can take different times for completion when the system resources are used dynamically. Furthermore, it may be unknown whether multiple applications are writing or otherwise depending to the same object, thereby creating dependencies of which the backup service may be unaware.

Thus, for a proper backup or restore operation for a given volume, application or object, some processes or files may first need to be frozen (no more writes associated therewith for the time being), and in a certain order according to the given object's dependencies. Especially in connection with a snapshot service, wherein state information regarding an atomic point in time is paramount to providing the point in time backup information, an intelligent determination of which applications or processes and only those applications or processes that need to be acted upon (frozen) and in what order would be advantageous.

It would be further beneficial to provide an informed determination of which applications may be excluded from a restore operation(s) to a previously known state of the object to be restored would provide still more efficiency to the recovery processes.

Often, a system crash or freeze might involve only a few problematic files or processes. For example, when an application is no longer responding, it is usually desirable from a system standpoint to terminate only the application that is not responding, or to find an application dependency that may be causing the program to freeze its response. Indeed, it is often the case that a programmer of application A can not anticipate all of the combinations and permutations of other applications B, C, D, etc. that will be installed on a given computer system for running application A. A state of operation of an application A may depend upon certain other applications, storage components, processes and files that are in application A's system space for proper execution, and these dependencies may be changing dynamically. Thus, a way of freezing the state of an application A at an atomic point in time by freezing objects upon which it may depend either vertically or horizontally is useful, and would be a vast improvement over freezing an entire volume of data (which may be much more freezing than is necessary to backup a single object) for a snapshot in time. The objects to which a given object being backed up may depend must be frozen or flushed in a proper order prior to the backup operation(s) since there may be embedded dependencies that must be unraveled in an order that is determined by those dependencies.

Thus, since a full backup or restore of an object of a computer system is undesirable from a resource standpoint, a way to retroactively recover from a crash or institute a backup, such as a snapshot service, by selectively and intelligently freezing certain data in a selective, efficient and proper order based upon the dependencies of the object would be a useful addition to the field of recovery.

"Database Computer System Using Logical Logging to Extend Recovery", U.S. U.S. application Ser. No. 09/268,146, now U.S. Pat. No. 6,978,279, filed Mar. 15, 1999, to Lomet et al. describes a technique for utilizing logical logging operations to reduce logging cost during a recovery process. By introducing identity operation that unexpose a nodal object from flush dependencies, an on the fly unwrapping of application flush dependency information is disclosed. Thus, in the event of a system crash, the problem of application dependencies has already been handled via logical logging operations and accordingly, no recovery difficulties are encountered in connection with the unraveled or unwrapped dependency. However, this technique does not determine an order in which to freeze objects based upon hierarchical object dependency information, and consequently may not be used for the freezing of a state of an object across all of the object's dependencies for a given point in time.

Consequently, it would be desirable to provide a way to retroactively recover from a crash or perform a backup or restore operation by selectively and explicitly analyzing application dependency information in a selective, efficient and proper order. It would be further beneficial to maintain information about volume snapshot dependencies i.e., hierarchical information about which applications depend on which other applications, which may have even further dependencies and so on, for a given point in time. It would be further desirable to use the volume snapshot dependency information in connection with a recovery from a crash, so that the process of recovery from a crashed state may be improved. It would be still further desirable to provide a uniform protocol by which applications may convey information about the objects upon which the applications depend.

SUMMARY OF THE INVENTION

The present invention relates generally to computer systems that may enter an unstable, frozen or crashed state. In a preferred embodiment, an application programming interface (API) protocol is used for making requests to registered applications regarding applications' dependency information so that a table of dependency information relating to a target object can be recursively generated. When all of the applications' dependencies are captured at the same time for given volume(s) or object(s), the entire volume's or object's program and data dependency information may be maintained for the given time. With access to this dependency information, the computer system advantageously knows not only which files and in which order to freeze or flush the files in connection with a backup, such as a snapshot, or restore of given volume(s) or object(s), but also knows which volume(s) or object(s) can be excluded from the freezing process.

After a request by a service for application dependency information, the computer system can translate or process dependency information, thereby ordering recovery events over a given set of volumes or objects. The set of volumes or objects may be co-located or remotely located relative to one another via a networked environment. In a preferred embodiment, dependency information is generated in connection with an iterative collaboration process between the system and applications, and a common protocol for an application programming interface (API). Thus, applications can communicate their external dependencies to a common software agent having a storage component, thereby maintaining a table, list or other organized information relating to applications' dependencies for a target object for a consistent point in time. This table, list or other organized information advantageously can be used as part of a service such as a backup, restore or recovery process, or any service wherein consistent point in time application dependency information is useful to the service.

Other features of the present invention are described below.

BRIEF DESCRIPTION OF THE DRAWINGS

The system and apparatus for providing volume snapshot dependency information is further described with reference to the accompanying drawings in which.

DETAILED DESCRIPTION OF PREFERRED EMBODIMENTS

Figure 1:
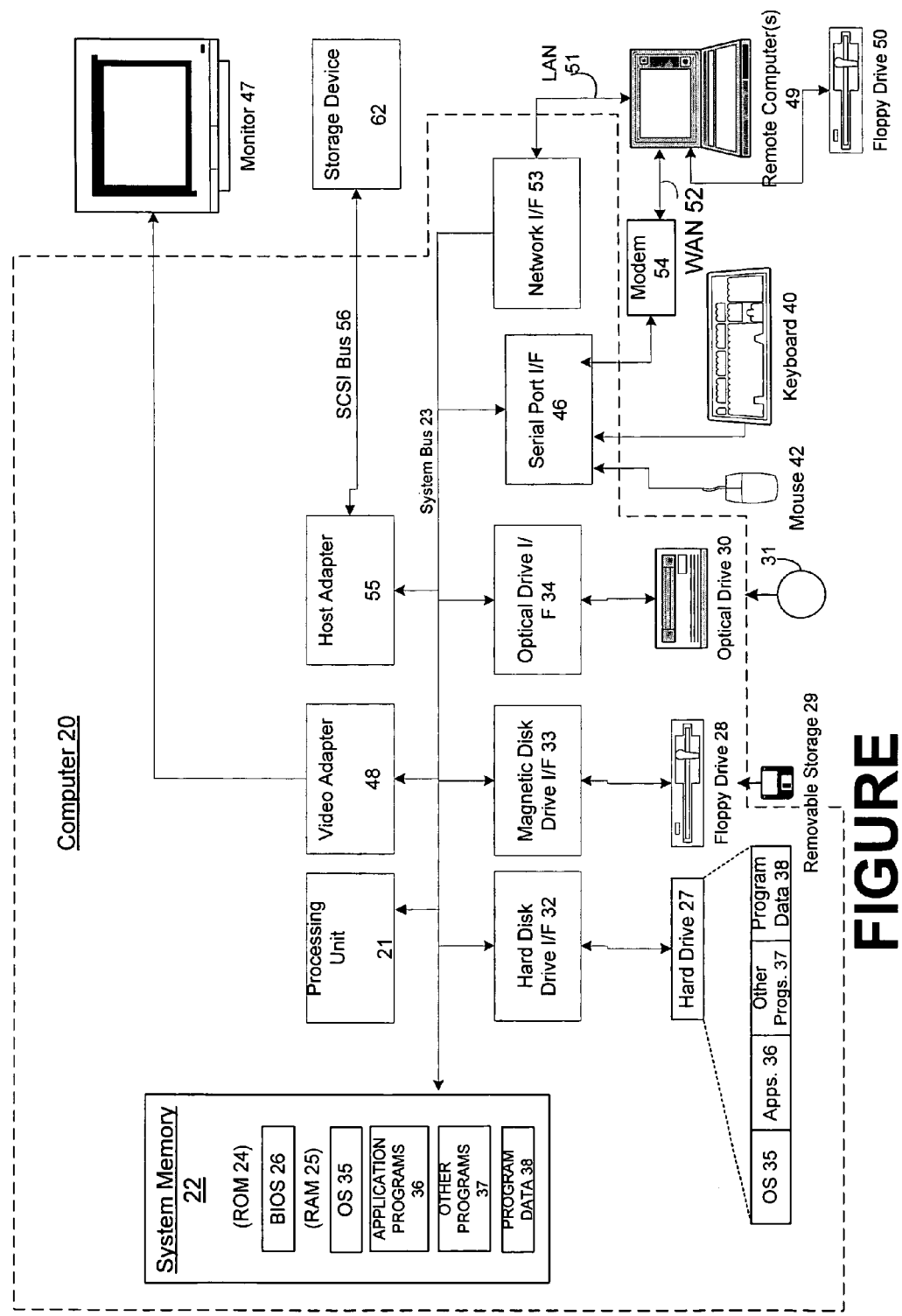
FIG. 1 is a block diagram representing a general purpose computer in which aspects of the present invention may be incorporated.

This invention relates to any computer system in which an unstable, frozen or crashed state may result from use thereof. When all of the applications' dependencies are captured at the same time for a given volume (or other target object), the entire volume's program and data dependency information may be maintained for the given time. With access to this volume dependency information, the computer system advantageously knows which files to include and how to order their inclusion in a backup, restore or other recovery process. By the same token, it is also known which files can be excluded from the process.

Application dependencies refer to a hierarchical organization of an application's state dependency in relation any one or more of files, registry keys, database records, active directory entities, an IIS metabase and the like.

In a preferred embodiment, an application programming interface (API) dependency module services application dependency information requests concerning certain objects that have dependencies upon a target object. The dependency information is generated in connection with an iterative collaboration process between the system and applications. As a result of the collaboration process, applications can communicate their external dependencies to a common software agent, thereby maintaining a table or list of information relating to applications' dependencies in a storage component. Then, in the event of a crash or freeze, the computer system can translate or process the volume (or target object) snapshot dependency information, thereby ordering recovery events over a given set of volumes. This table or list of information advantageously can be persisted for reuse later as a part of another backup, restore or recovery process, wherein a state and/or dependencies of the target object remain unchanged.

In a preferred embodiment, a backup or snapshot service exploits the application dependency information in connection with a backup or snapshot operation of a service. A backup service thus knows which applications and processes need to be frozen in time before others, based on the hierarchy of dependency, to successfully complete the backup. Similarly, a snapshot service knows which applications and processes need to be frozen in time before others, based on the hierarchy of dependency, to successfully complete the snapshot. A consistent point in time system, volume or object snapshot is particularly well suited to the present invention since a snapshot is sensitive to out of order application freezes, and other potential data corruptions, as described in the background of the invention.

As discussed above, the present invention provides an improved system crash recovery technique. The present invention addresses the shortcomings of the prior art in several ways. As mentioned above, a problem with system crash recovery techniques is that information about volume snapshot dependencies is not available for use in connection with a backup or recovery process or other service that is suited to the use of application dependency information. The infrastructure of the present invention provides an API that maintains communication with applications and other objects so that application dependency information may be stored for use in connection with returning the system to a pre-crash state or in connection with a backup or snapshot process or other service.

In accordance with the present invention, application dependency information relating a system's applications for a given time can also persist across a system crash, and the dependency information may be used for a restore operation wherein it is desirable to restore some or more of a target object's dependencies in a certain order. For example, a service may periodically be called according to preset rules or other rules, whereby the service makes a request for the system to determine a consistent point in time set of dependency data for a target object. Later uses of the dependency information for the given time may include e.g., determining which applications to freeze from write operations, and in which order, prior to a backing up or crash recovery procedures.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
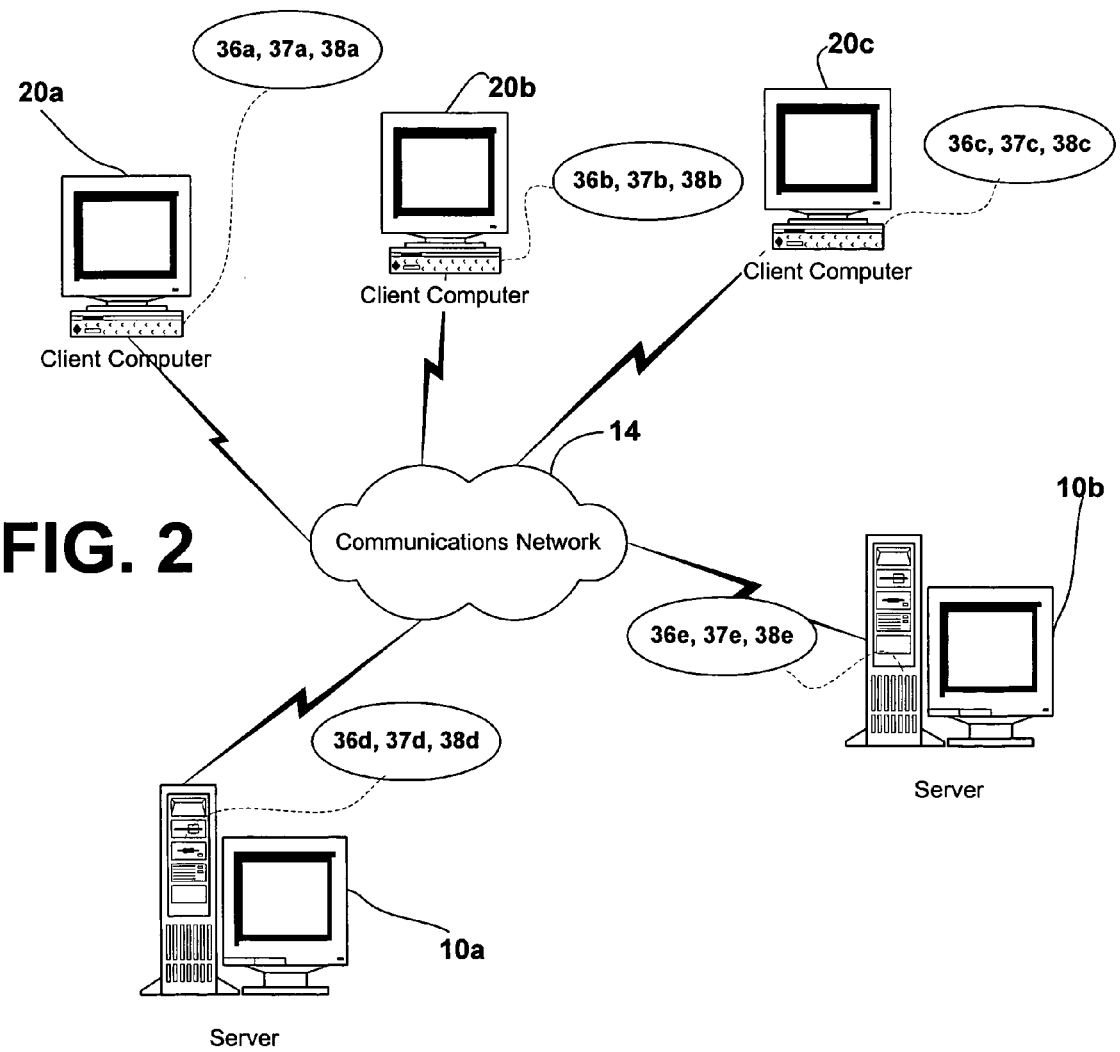
FIG. 2 is a block diagram representing an exemplary network environment with a server in connection with which the method and apparatus of the present invention may be implemented.

It should be noted that the computer described above can be deployed as part of a computer network, and that the present invention pertains to any computer system having any number of memory or storage units, and any number of applications and processes occurring across any number of volumes. Thus, the present invention may apply to both server computers and client computers deployed in a network environment, having remote or local storage. FIG. 2 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 20a, 20b, 20c, etc. In a network environment in which the communications network 14 is the Internet, for example, the servers 10 can be Web servers with which the clients 20 communicate via any of a number of known protocols such as hypertext transfer protocol (HTTP).

Each client computer 20 and server computer 10 may be equipped with various application program modules 36, other program modules 37 and program data 38, and with connections or access to various types of storage elements or objects. Thus, each computer 10 or 20 may have application dependency information associated therewith, which dependencies may exist across a system, including intravolume dependencies, intervolume dependencies and/or dependencies across a network or other types of dependencies wherein an application state depends externally.

Thus, the present invention can be utilized in a computer network environment having client computers for accessing and interacting with the network and a server computer for interacting with client computers. As mentioned previously, in accordance with the present invention, an API protocol is used in connection with communications of application dependency information among one or more of applications (or other objects), a common software agent, the registry, a storage component and a service. This API can be implemented with a variety of network or system architectures, and thus should not be limited to the example shown and described.

Figure 3A:
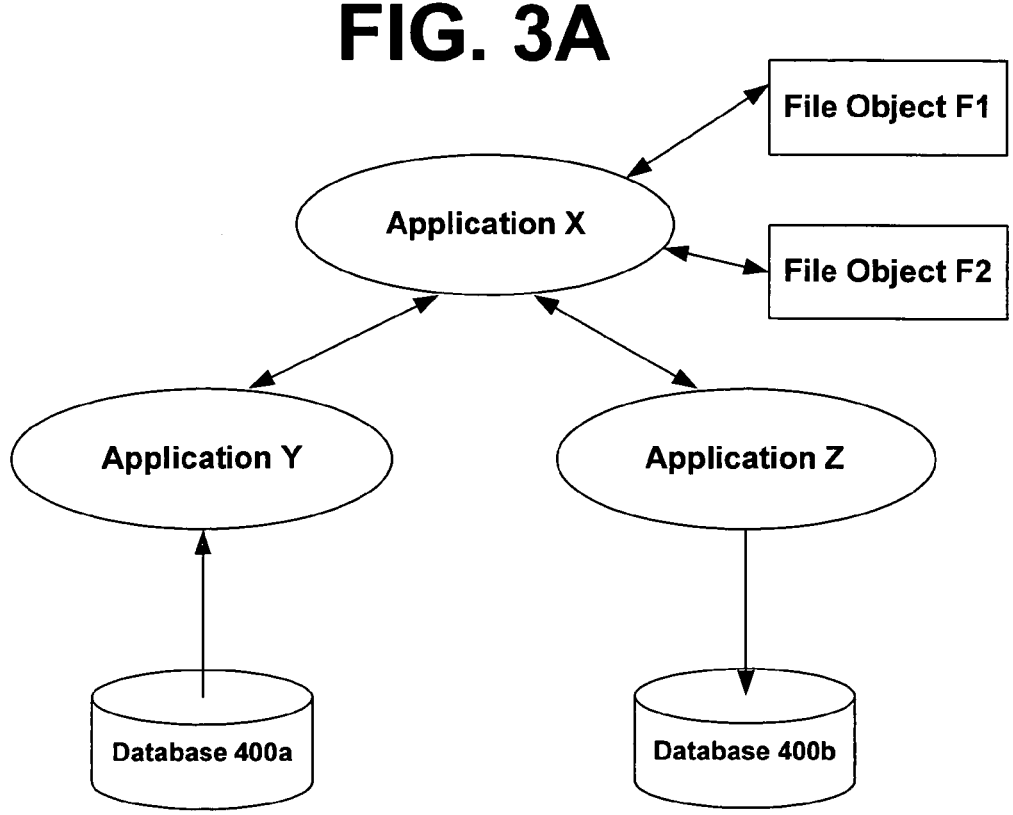
FIGS. 3A and 3B are block diagrams depicting exemplary hierarchies of application dependency information in accordance with the present invention.
Figure 3B:
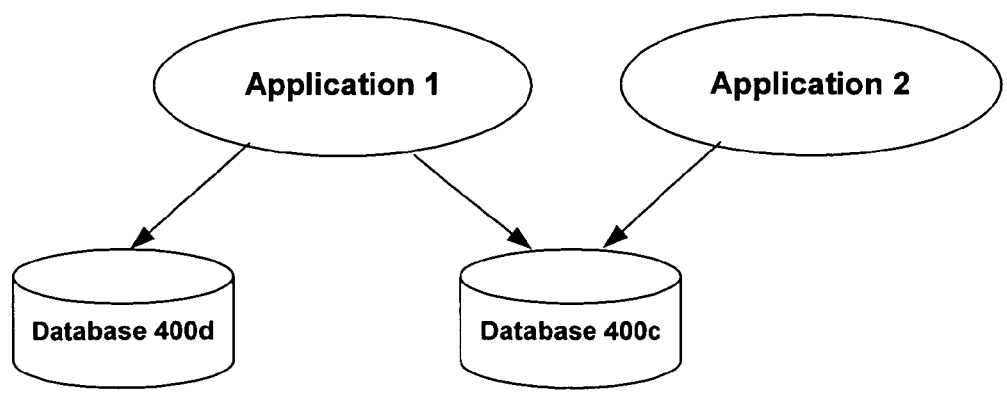

FIGS. 3A and 3B are exemplary hierarchies of state dependencies, reflecting vertical and horizontal aspects of potential application dependency information, to be captured in storage for use in connection with a service. In FIG. 3A, application X communicates with objects Y and Z, whereby object Y performs read access of a database 400a and whereby object Z performs write operations to database 400b. Application X may also write to File Objects F1 and F2. A service may utilize this information as captured at a point in time in connection with, e.g., a backup or restore operation. Thus, knowledge of application X's point in time state dependencies may greatly benefit certain types of system service operations. FIG. 3B demonstrates hierarchical information across applications 1 and 2, which both perform write operations to database 400c. One or both of these write operations might be longer than another, occur simultaneously, or otherwise corrupt the data in database 400c. Consequently, information about the application dependencies of applications 1 and 2 at an atomic point in time greatly aids the process of, for example, restoring Application 1 after a crash. If Application 2 is not frozen before attempting to restore Application 1, an error may result. Additionally, backup operations pertaining to Applications 1 and 2 are aided by knowledge of the hierarchical dependency information. While these examples of application state hierarchies include applications and databases, it should be understood that data with dependency may be stored in many different types of storage elements, including files, database records, registry keys, active directory entities, an IIS metabase and so on having dependencies to other such objects.

Figure 4:
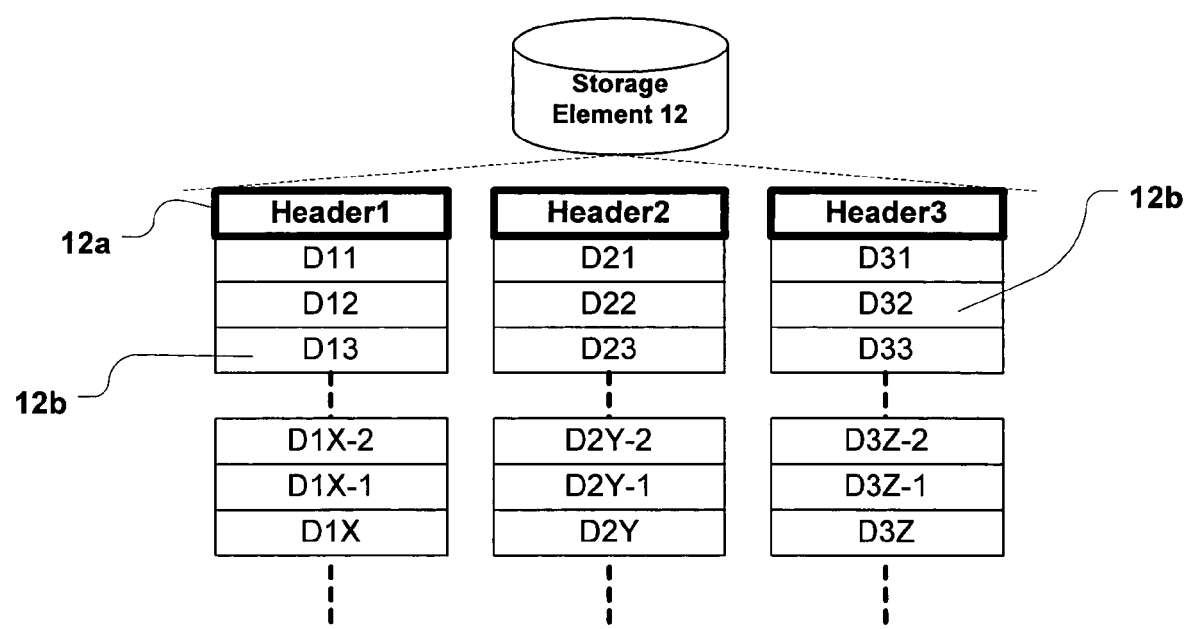
FIG. 4 is a block diagram of an exemplary storage component for storing application dependency information in accordance with the present invention.

FIG. 4 shows an exemplary data structure, utilized by the API of the present invention, for storing application dependency information. A storage component 12, such as a database or hard disk memory, can thus have lists or tables of dependency information stored therein. In accordance with the present invention, an individual list or table, e.g., can have a header 12a and characteristics 12b, such as hierarchical dependency information or time of capture information, as well as other information relating to services that may use the information. In a preferred embodiment, the hierarchical dependency information 12b is expressed in XML format, but may be any format suited to the expression and communication of application dependency information.

Figure 5:
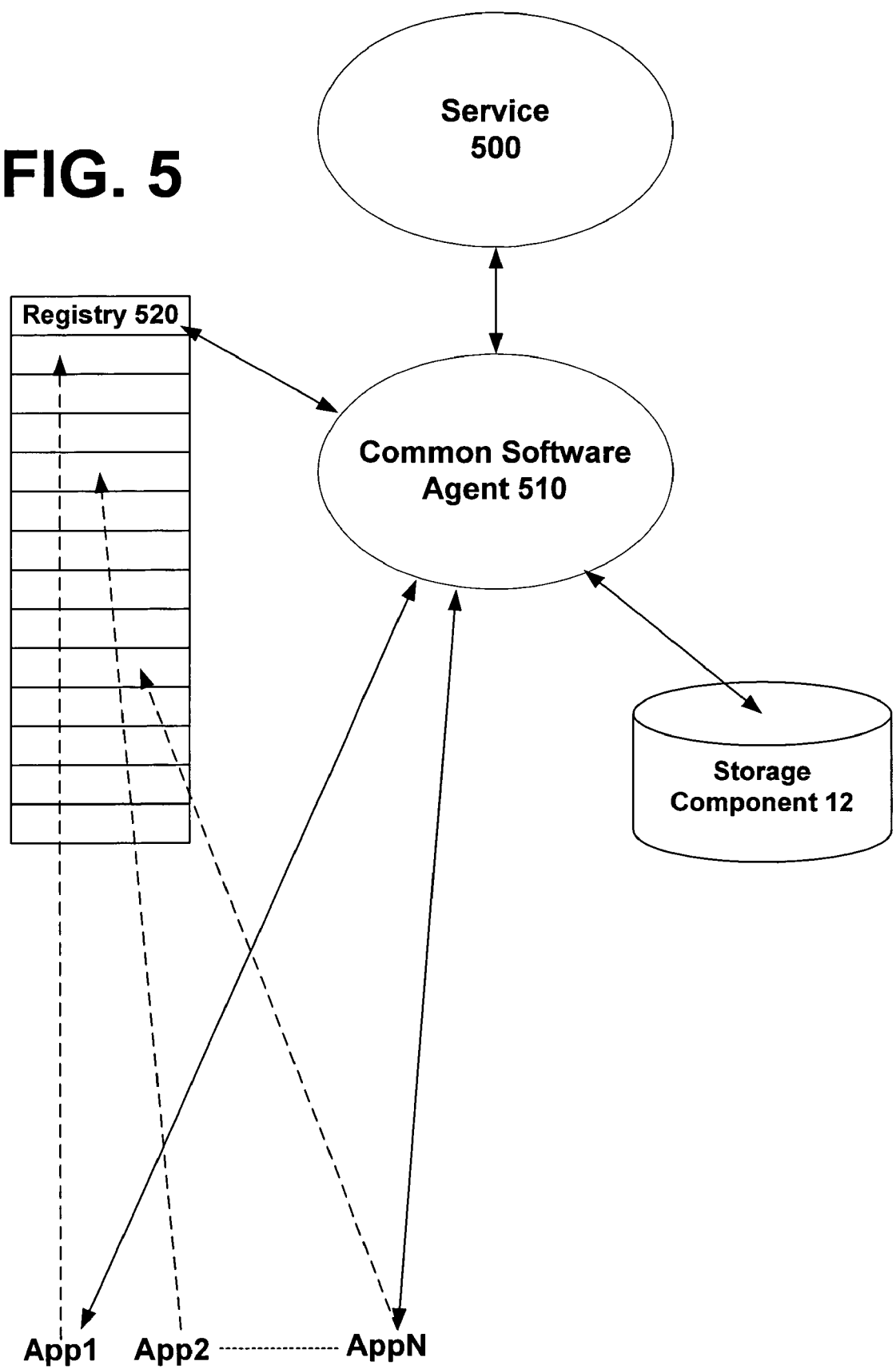
FIG. 5 is a flow diagram of an exemplary sequence in accordance with the present invention whereby application dependency information is communicated to a storage component.

As mentioned above, the present invention includes a collaboration process between the system and applications. As shown by the system architecture of FIG. 5, applications, once registered (represented by the dotted lines) can communicate their external dependencies to a common software agent 510 in response to a request for their dependency information. Thus, a service 500 can request application dependency information for a target object for a given point in time. If the target object has been registered, agent 510 can make requests to the target object for the target object's application dependencies, and thereby initiate the storage of a table or list of information relating to the target object's dependencies in a storage component 12. The target object dependencies are then explored for further dependencies by making further requests to applications for dependency information. Through this recursive process, a complete list of the target object's dependencies are generated and stored in storage component 12. The complete list is then communicated to the service 500 via agent 510. A service 500 may be a generic service for generating a consistent point in time dependency list for a target object, and may be utilized separately from or in connection with a backup, snapshot or restore service.

The API protocol enables scheduled calls to applications for dependency information according to the service rules for collecting application dependency information. Additionally, applications may be registered or installed into the infrastructure enabled by the API of the present invention and thereby may communicate an initial set of state dependencies to the agent for storage at the same time. It is also technically feasible for an application to issue application dependency information any time a state relating to itself changes, or a complete set of dependency information may be scheduled (either by the agent 510 or service 500) and collected periodically. Thus, in accordance with the API protocol of the present invention, an application is capable of understanding which other objects or applications it depends on i.e., an application is conscious of its own dependencies. Additionally, an exemplary format for communications between the API of the present invention and the applications App1 to AppN, agent 510 and/or a backup service 500 is XML, but again it should be noted that no particular format should be controlling.

Figure 6:
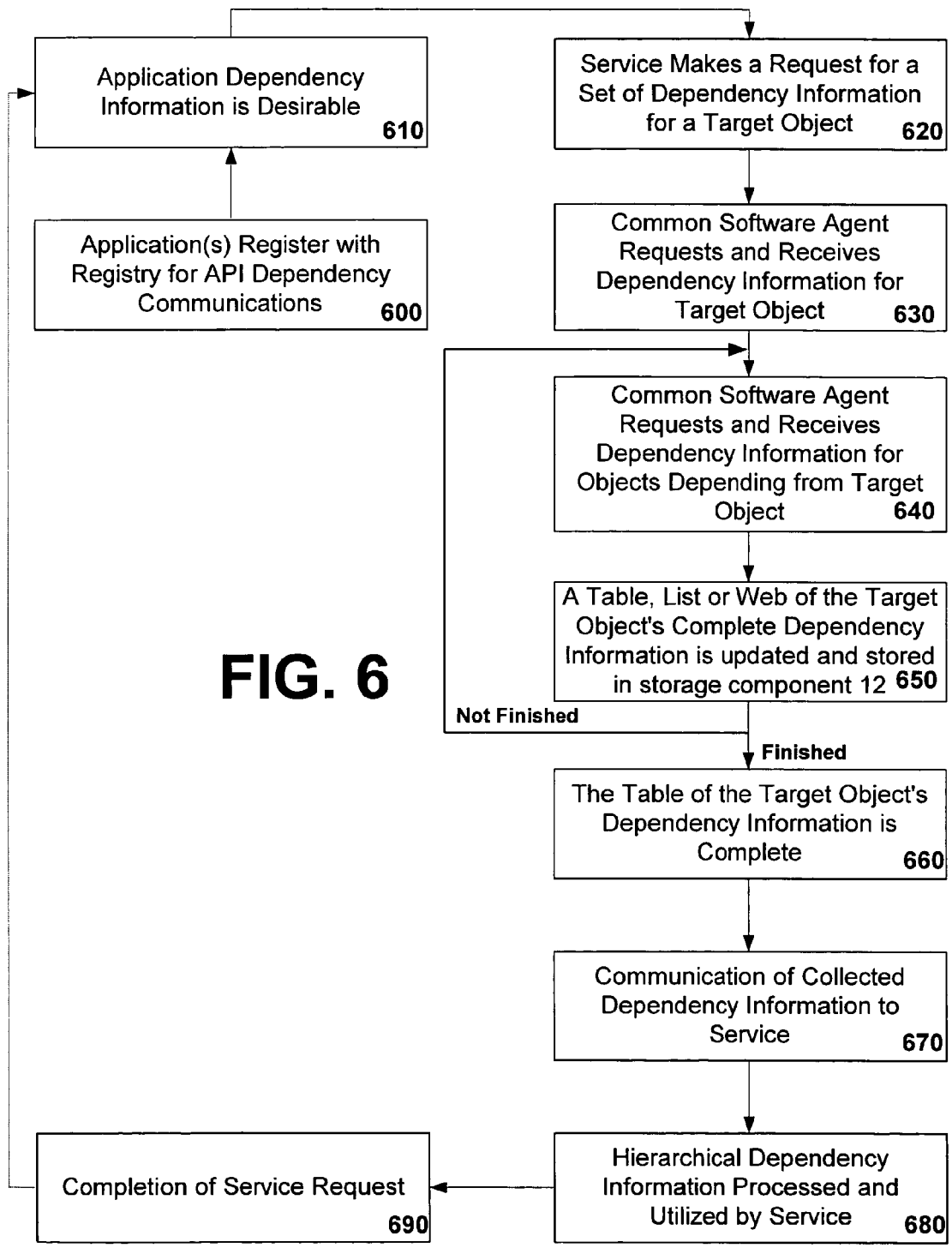
FIG. 6 is a flow diagram of an exemplary sequence in accordance with the present invention wherein application dependency information stored in a storage component is requested and utilized by a service.

FIG. 6 is a flow diagram of an exemplary sequence in accordance with the present invention wherein the application dependency information, stored in storage component 12 and managed by the agent 510, is utilized by a service in connection with a service operation. At 600, e.g., applications may be registered with the infrastructure provided by the API protocol of the present invention. Applications may be registered or unregistered at any time. At 610, a determination is made that application dependency would be desirable information. At 620, the service 500 makes a request for dependency information relating to particular volume, application, database and/or the like (a target object). At 630, agent 510 makes a request to the API dependency module for the target object, and a set of dependency information related to the object to be serviced. At 640, the agent 510 requests dependency information from certain registered applications depending in various degree to the target object. Preferably, the agent issues a request that is limited to the target object's dependencies requested by the service.

At 640 through 660, dependency information is recursively delivered to the agent 510 pursuant to various requests for a complete set of dependency information, until a complete version of dependency information for a target object (e.g., hierarchical information reflected by Application X of FIG. 3A) has been stored in storage component 12. At 660, there is no more application dependency information being delivered from the applications because the request for a complete set of dependency information relating to the target object has been fulfilled. At 670, agent 510 communicates the dependency information to the service 500. In a preferred embodiment, only the minimum amount of dependency information necessary to complete the service request is communicated to the service 500. At 680, the hierarchical dependency information is processed and utilized by the service. The service request is thus complete at 690 and the flow may optionally return to 610.

Although the exemplary sequence of FIG. 6 has been described in connection with a generic service 500, the contemplated uses for application dependency information applies far and wide to any process for recovery, process containing application interaction, or process wherein applications are considered relative to other applications' and objects' operations.

Figure 7:
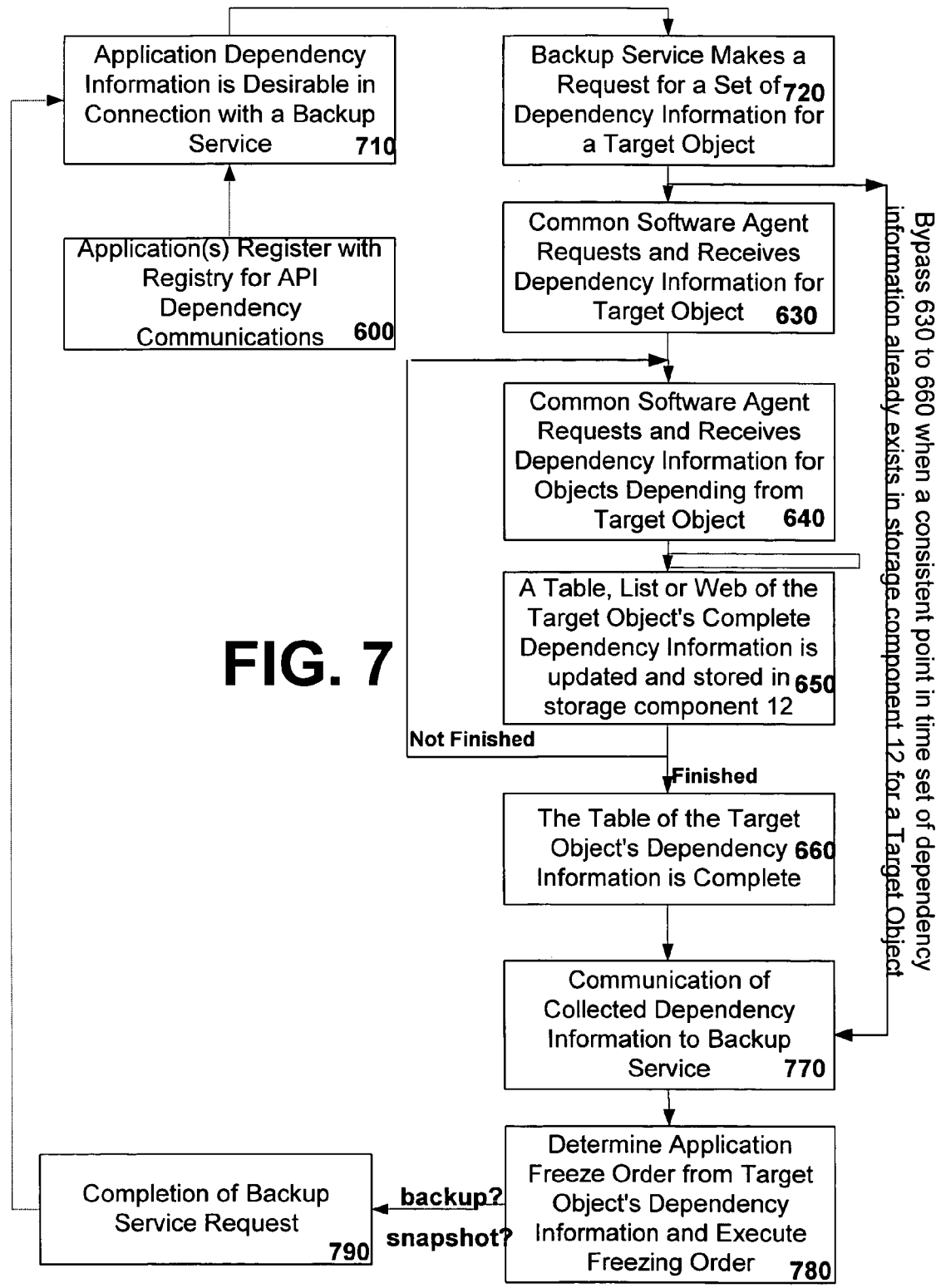
FIG. 7 is a flow diagram of an exemplary sequence in accordance with the present invention illustrating a preferred embodiment wherein a backup or snapshot operation is performed utilizing the application dependency information stored in accordance with the present invention.

FIG. 7 is a flow diagram of an exemplary backup sequence in accordance with the present invention illustrating a preferred embodiment wherein a backup or snapshot operation is performed utilizing the application dependency information stored in accordance with the present invention. FIG. 7 is illustrative a specific type of service, a backup service such as a full backup operation or a snapshot service, that may overlay the architecture of FIG. 6. Once a generic service 500 is described, a more specific service may also be used. In a preferred embodiment of the present invention, at 710, application dependency information is desirable in connection with a backup service and at 720, the information for the target object is requested. If the dependency information already exists due to a prescheduled dependency information collection, the flow may skip to communicating the information to the backup service at 770; otherwise, acts 630 through 660 are performed as in FIG. 6.

Next, at 780, a freeze order is determined from the target object's dependency information, and the freeze order is executed. For example, the hierarchical dependency context depicted in FIG. 3B may be used to illustrate a flush or freeze order determination and execution that might be utilized in connection with the acts of 780. For example, on the basis of the application dependency information collected by the agent 510 and provided to the backup service, it may be determined that the backup service should first freeze or flush Application 2 and then freeze or flush Application 1, in order to perform a proper backup service or other service such as a restore operation for the target object Application 1. Once the objects of the computer system have been frozen in the proper order for a backup or a snapshot service, the backup or snapshot service may finish its operation without regard to application dependencies at 790. Once again, the flow may return to 710 for another service operation.

The various techniques described herein may be implemented with hardware or software, where appropriate, or with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques and snapshot techniques of the present invention may invariably be a combination of hardware and software to be utilized in connection with storing data or taking snapshots of data, respectively.

While the present invention has been described in connection with the preferred embodiments of the various figures, it is to be understood that other similar embodiments may be used or modifications and additions may be made to the described embodiment for performing the same function of the present invention without deviating therefrom. For example, while in a preferred embodiment, XML is used as a communications protocol for dependency information, it should be understood that many different communications and network protocols may be suited to the delivery of dependency information in accordance with the present invention. Furthermore, it should be emphasized that a variety of computer platforms, including handheld device operating systems and other application specific operating systems are contemplated. Therefore, the present invention should not be limited to any single embodiment, but rather construed in breadth and scope in accordance with the appended claims.

What is claimed is:

1. A method for utilizing applications' state dependency information to efficiently perform a backup service operation in a computer system, comprising the acts of:

registering applications loaded in said computer system with an application dependency application programming interface (API) for communication of application state dependency information among applications, a common software agent, a storage component utilized by said agent, and a backup service;

storing in said storage component said applications' state dependency information;

communicating by said agent, said applications' state dependency information from said storage component to said backup service;

maintaining by said agent, hierarchical application dependencies of said registered applications for backup operation; and retroactively recovering by said agent, said computer system to a pre-crash state after selectively analyzing said state dependency information and determining an application freeze order.

2. The method as recited in claim 1, wherein said backup service includes a snapshot service.

3. The method as recited in claim 1, wherein said backup service includes an execution of the freezing of applications in the order reflected by the determined application freeze order.

4. The method as recited in claim 1, further comprising the act of loading said application dependency application programming interface (API) into said computer system.

5. The method as recited in claim 1, further comprising the act of said backup service requesting a set of application dependency information from a common software agent for use in connection with a restore operation.

6. The method as recited in claim 5, wherein said set of application dependency information is a minimum set of information from said storage component for successfully completing the restore operation.

7. The method as recited in claim 5, further comprising the act of said agent issuing a request to at least one registered application for information from said set of application dependency information requested by the service.

8. The method as recited in claim 1, further comprising the act of at least one registered application communicating information to said agent in response to a request by said agent, said information relating to said at least one application's state dependency information.

9. The method as recited in claim 1, further comprising the act of unregistering an application.

10. The method as recited in claim 1, wherein said API uses a communication format comprising XML.

11. The method as recited in claim 1, wherein said agent stores said applications' state dependency information in a tabular format reflective of hierarchical application dependencies in said storage component.

12. The computer readable storage medium having computer-executable instructions for instructing a client computer to perform the acts of the method recited in claim 1.

13. The method as recited in claim 1, further comprising generating said state dependency information recursively.

14. An application programming interface (API) embodied in a computer readable storage media having computer executable instructions for use in a computer system, said instructions comprising:

instructions to register applications loaded in said computer system with said API for communication of application state dependency information among applications, a common software agent, a storage component utilized by said agent, and a service;

instructions to store said application state dependency information in said storage component;

instructions to communicate by said agent said application state dependency information from said storage component to said service;

instructions to maintain hierarchical application dependencies of the registered applications for service operations; and instructions to retroactively recover said computer system to a pre-crash state after selectively analyzing said state dependency information and determining an application freeze order.

15. The API as recited in claim 14, wherein the service to which said agent delivers said information is a backup service.

16. The API as recited in claim 14, wherein said service includes a snapshot service.

17. The API as recited in claim 14, wherein said agent stores said application dependency information in a tabular format reflective of hierarchical application dependencies in a storage component.

18. The API as recited in claim 14, further comprising instructions to generate said state dependency information recursively.

19. A computer system, comprising:
   a plurality of applications loaded and registered in said system, wherein at least one of said applications has at least one external state dependency with other said applications;
   a storage component for storing application state dependency information, wherein said dependency information is configured to include information about said at least one external state dependency;
   an agent that functions according to communication protocols of an application programming interface (API) in said system for processing said at least one application's state dependency information, said application's state dependency information includes information about dependencies among said applications, and said API is configured to communicate said state dependency information among said applications, said agent, said storage component utilized by said agent, and a backup service;
   said service makes requests to said agent for said application's state dependency information; said agent collects, stores and packages said application's state dependency information in response to a request by said service, and delivers said application's state dependency information to said service for further processing by said service;
   said agent maintains hierarchical application dependencies of said registered applications for a backup operation, and retroactively recovers said computer system to a pre-crash state after selectively analyzing said state dependency information and determining an application freeze order.

20. The computer system as recited in claim 19, wherein the service to which said agent delivers said dependency information is a backup service.

21. The computer system as recited in claim 19, wherein said service includes a snapshot service.

22. The computer system as recited in claim 19, wherein said agent stores said at least one application's state dependency information in a tabular format reflective of hierarchical application dependencies in a storage component.

23. The method as recited in claim 19, wherein said dependency information is the minimum set of information from said storage component for successfully completing the service.

24. The computer system as recited in claim 19, wherein said agent generates said state dependency information.

* * * * *